United States Patent [19]

D'Imperio

[11] Patent Number: 4,606,821
[45] Date of Patent: Aug. 19, 1986

[54] SECTIONALIZED INTEGRATED AQUARIUM

[76] Inventor: David D'Imperio, 934 SW. 21st Ct., Fort Lauderdale, Fla. 33315

[21] Appl. No.: 603,671

[22] Filed: Apr. 25, 1984

[51] Int. Cl.⁴ .......................... E04H 3/16; E04H 3/20
[52] U.S. Cl. ................................ 210/169; 210/416.2; 119/5
[58] Field of Search ..................... 210/169, 416.2, 776; 261/DIG. 17; 119/5

[56] References Cited

U.S. PATENT DOCUMENTS

| | | | |
|---|---|---|---|
| 3,511,376 | 5/1970 | Selsholtz | 210/169 |
| 3,774,766 | 11/1973 | Brock | 210/169 |
| 3,835,813 | 9/1974 | Katz | 210/169 |
| 4,220,530 | 9/1980 | Gabriele | 210/169 |

*Primary Examiner*—Richard V. Fisher
*Assistant Examiner*—Sharon T. Cohen
*Attorney, Agent, or Firm*—Ruth Moyerman

[57] ABSTRACT

A sectionalized, integrated, aquarium is disclosed. A parallelpipedal housing is formed by two interlocking U-shaped members. The area thus formed is divided into two compartments—an aquarium compartment and a mechanical filtering chamber. The filtering chamber contains filters and a reservoir. The aquarium compartment contains a bottom filter. The sections are divided by a vertical wall which has internal plumbing members and serves as a conduit as well as a divider. Water enters the aquarium section from the reservoir through the vertical panel and piping. Water is released from the aquarium compartment to the mechanical filtering chamber by waterfall action through slots in the upper part of the vertical panel. Water is continually in circulation between the sections, being continuously aerated and filtered.

15 Claims, 6 Drawing Figures

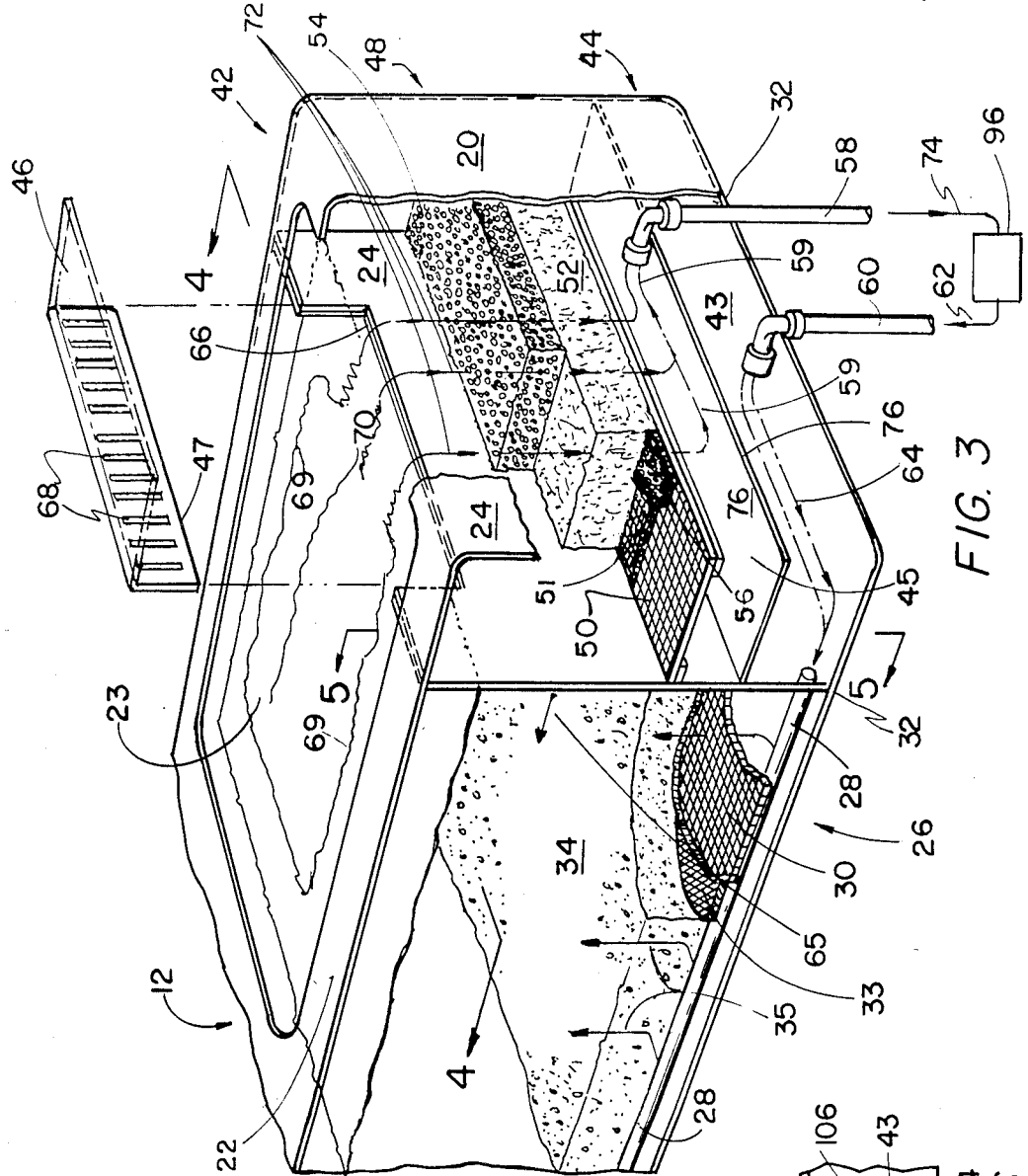
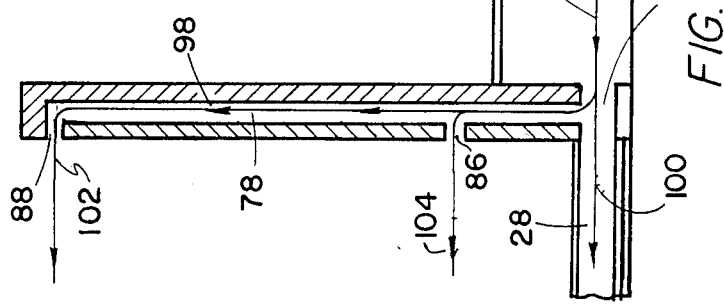

SECTIONALIZED INTEGRATED AQUARIUM

BACKGROUND OF THE INVENTION

1. Field of the Invention

This invention relates to aquariums and more particularly to an aquarium including an integrated filtering system.

2. Description of the Prior Art

There are many aquarium products on the market today for both fresh and salt water fish. All of the more sophisticated aquariums require the addition of filters, heaters and the like. Usually these additions are placed into the aquarium itself, hung over the side, or set on the bottom. Such extraneous devices are unsightly and use space that might better be used for housing the fish.

Some systems are also available which employ an exterior filter which is connected to the aquarium by tubes—again, an unsightly arrangement and inconvenient for maintenance.

For aquarium owners, there is presently no device which continuously aerates and filters an aquarium and which is actually an integrated, yet hidden, part of the aquarium itself—not a separate device.

SUMMARY OF THE INVENTION

The aforementioned prior art problems are overcome by the device of this invention which is a free standing, sectionalized integrated aquarium.

The aquarium is comprised of a parallelpipedal housing formed of two generally U-shaped, interlocking sections. Also included are interior dividers and a lid. Within the housing is a vertical panel separating the aquarium section into a mechanical filtering chamber and an aquarium compartment. The panel has internal plumbing and a removable slotted section at its top.

Water is continuously pumped from a reservoir in the mechanical filtering chamber into the aquarium compartment. Water enters the aquarium by two paths simultaneously. Water from the reservoir enters a pipe outlet in the vertical panel and then is released, through pipe apertures, into the bottom filter of the aquarium section. Simultaneously, water enters a vertical channel in the vertical panel and is released through apertures into the aquarium compartment. Water circulated back into the mechanical filtering chamber through the vertical panel's upper slotted section is then filtered and returned to the reservoir for recirculation.

The bottom filter in the aquarium section includes a grid covered by a foraminous screening, preferably laminated fiberglass window screening, and gravel. The grid rests on the piping which is perforated so that water is directed downward. The water is then biologically filtered as it rises through the filtering elements.

The mechanical filtering chamber includes a multistage filter having a coarse layer of ceramic rings resting on a fine layer of polyfoam supported by a foraminously covered grid. There may also be chemical filterants added to this chamber between the grid and the foraminous screen. Also, a heater may be added in the reservoir.

The translucent ceiling of the aquarium forms a compartment of one of the U's and may be transparent to allow natural light to enter the aquarium compartment. Optionally, an external light may also be placed above this section. Access holes are also included in the ceiling to provide entrance of air and food into the compartment.

The sectionalized integrated aquarium is preferably constructed of transparent acrylic with the U sections bonded together to form a watertight container. The U's may be painted so that only the aquarium compartment is visible. Thus, the unsightly heating, pumping and filtering systems, although a vital part of the aquarium, are not visible to the viewer.

It is, therefore, an object of this invention to provide an aquarium which requires no external filtration system.

It is another object of this invention to provide a device which supplies both mechanical and biological filtration in an aquarium in a controlled sequence.

It is still another object of this invention to provide an aquarium formed from interlocking U-shaped sections of transparent acrylic.

It is a further object of this invention to provide an aquarium in which continuous aeration and filtration occurs.

It is yet a further object of this invention to provide an aquarium which hides from the viewer's sight all mechanical elements.

It is still a further object of this invention to provide a device which is suitable for use with either salt water or fresh water fish.

It is yet a further object of this invention to provide an aquarium which may be produced in varying sizes to suit the different needs of the users.

It is yet another object of this invention to provide a sectionally integrated aquarium which may be used in a series of identical aquariums to create a large stable aquarium system utilizing a central pump.

These and other objects will be more readily ascertainable to one skilled in the art from a consideration of the following Figures, description and exemplary embodiments.

BRIEF DESCRIPTION OF THE DRAWING(S)

FIG. 1, an elevation, depicts the aquarium of this invention in use.

FIG. 3 is an isometric of the device in cutaway showing the two compartments of the aquarium section and the flow pattern of the water.

FIG. 6 is a cross section of a channel in the vertical panel taken on lines 6—6 of FIG. 5.

DETAILED DESCRIPTION OF THE PREFERRED EMBODIMENTS(S)

Figure 1:
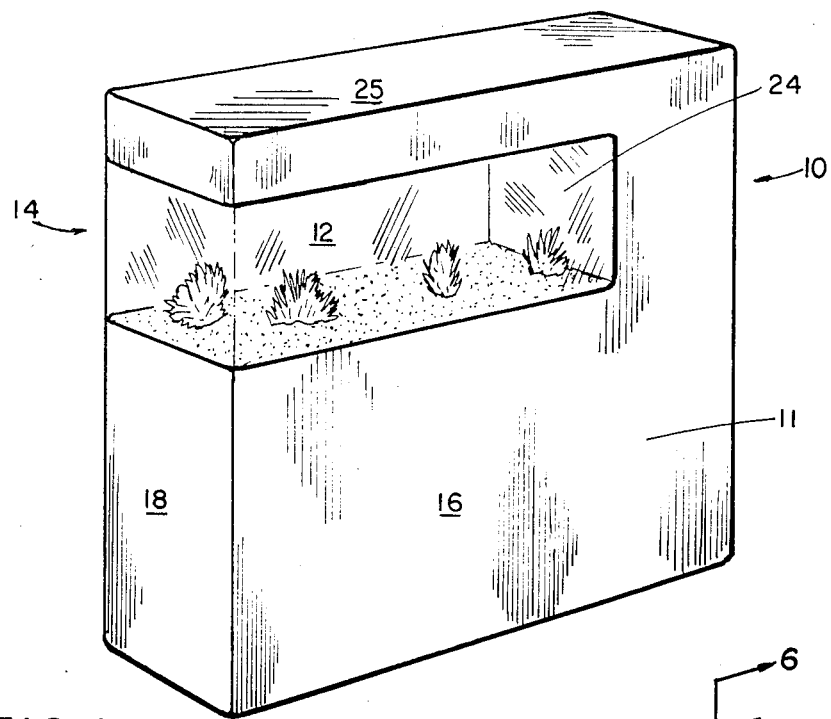

Referring now to FIG. 1, sectionalized integrated aquarium 10 is shown ready for use. All surfaces of sectionalized aquarium 10 may be painted or otherwise rendered opaque except aquarium compartment 12. Thus, the equipment areas of sectionalized aquarium 10 are hidden from view, leaving only the interior of aquarium compartment 12 visible. It is an important visual characteristic of this invention that aquarium compartment 12 not be cluttered with filtering devices, but that aquarium compartment 12 display only the fish and their environs.

Also seen in FIG. 1 are longitudinal back wall 14 and front wall 16, end wall 18, and lid 25. Sectionalized aquarium 10 is formed by interlocking two U-shaped sections and then bonding them together as will be explained in relationship to subsequent views. The components of the second U-shaped section are visible in FIG. 2. The first U-shaped section is formed of longitudinal walls 16 and 14 and end wall 18. These walls extend the entire height of sectional aquarium 10 and form housing 11.

Vertical panel 24, which is an interior wall, is visible in FIG. 1.

To provide artificial light, lid 25 is removable and a standard aquarium light may be attached to lid 25 to provide a more constant light source.

Figure 2:
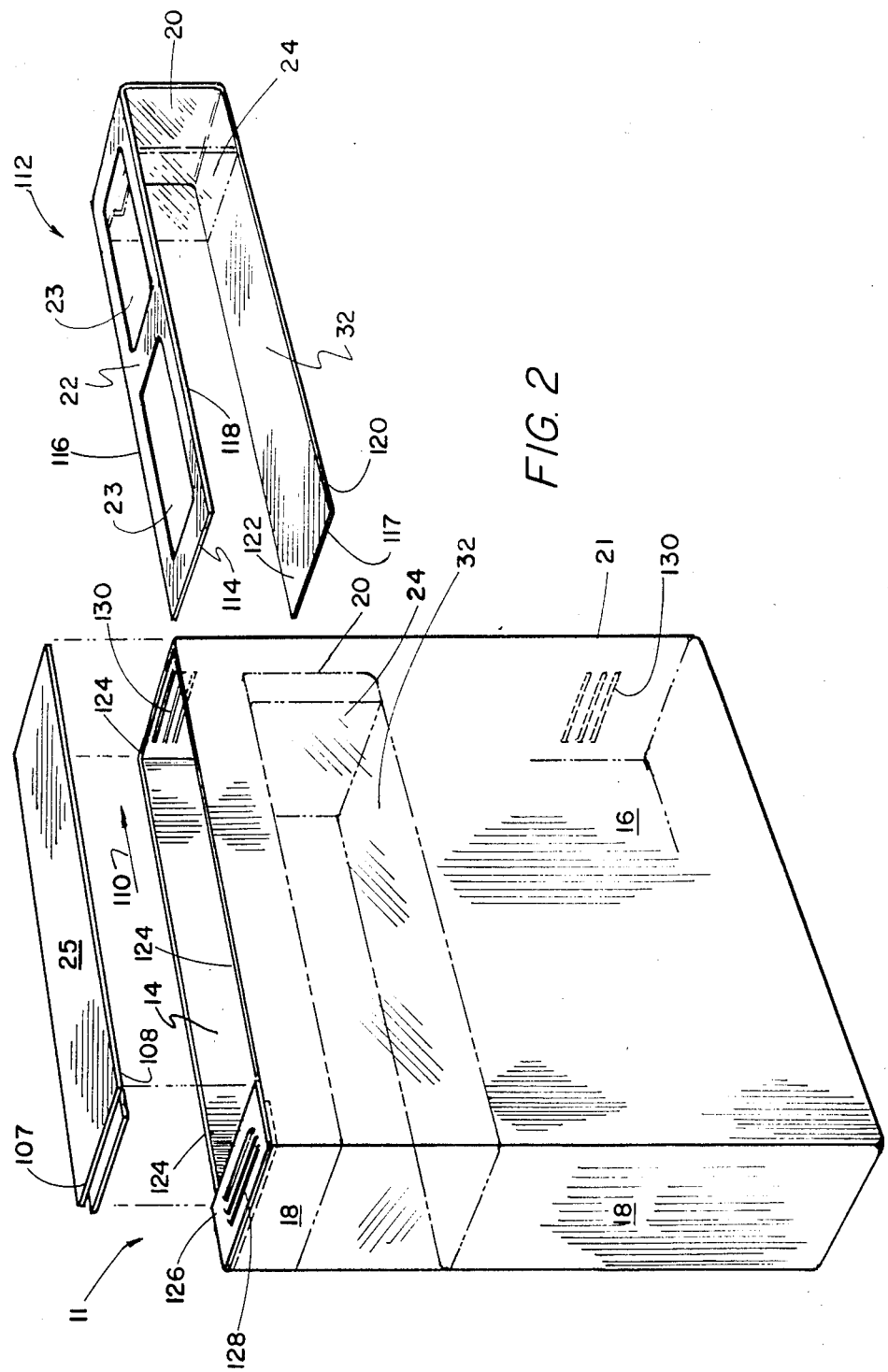
FIG. 2 is an exploded view of the U-shaped housing construction of this invention including a removable lid.

Now referring to FIG. 2, an exploded view of the U-shaped construction of the invention is seen. Housing 11 is seen having end wall 18 and longitudinal walls 16 and 14. Walls 18, 14 and 16 extend the full height of sectionalized aquarium 10 to form housing 11.

Aquarium compartment 12, filtering chamber 42 and reservoir 44 (all seen in FIG. 3) are formed by U-shaped section 112. Components of U-shaped section 112 are ceiling 22 with openings 23, floor 32 and end wall 20. U-shaped section 112 is bonded inside housing 11 with ends 114 of ceiling 22 and 117 of floor 32 butting against wall 18 as shown in phantom. Longitudinal edges 116 and 118 of ceiling 22, and edges 122 and 120 of floor 32 abut walls 16 and 14 and are bonded to them. All bonding of aquarium components, if plexiglass, may easily be achieved by using solvent based acrylic cement.

Also seen in FIG. 2 is removable lid 25. Lid 25 has top area 107 and bottom area 108. Top area 107 is wider than bottom area 108 and bottom area 108 is longer than top area 107, allowing aquarium 10 to be sealed, yet permitting lid 25 to be readily removed. Lid 25 may thus be lifted from top 124 of walls 14, 16 and 21, or it may be moved by sliding it in the direction of arrow 110 to allow for daily feeding of fish.

It may be seen in FIG. 2 that lid 25 is actually as extension section of second ceiling 126. By the addition of lid 25 and removable end wall 21, all working areas of aquarium 10 are hidden from view when opaque walls are used, as seen in FIG. 1. Yet, access is possible to all areas by removal of lid 25 or wall 21. Thus, a sealed aquarium and filtering area are within housing 11. Additional supports for U-shaped section 112 may be added below floor 32, if desired. When U-shaped section 112 is bonded to housing 11, (as shown in phantom), an area is created between top edge 124 and U-shaped section 112 for placement of an optional light.

Also seen in FIG. 2 is second ceiling 126 and end wall 21. Wall 21 is attached to walls 16 and 14 after U-shaped section 112 (with vertical panel 24 bonded in position) is in place. End wall 21 may be segmented for easier access to U-shaped section and tubing 58 and 60. Since U-shaped section 112 is shorter in length than walls 14 and 16, a space is created between end wall 20 and end wall 21. This space allows room for tubing 58 and 60 (seen in FIG. 3).

Also seen in FIG. 2 are slots 128 in ceiling 126, and slots 130 in wall 21. Slots 128 allow for air intake for ventilation of aquarium compartment 12. Slots 130 at top and bottom of wall 21 provide ventilation for pump 96.

Now referring to FIG. 3, the sectional and filtering aspects of this invention are shown. End wall 20, ceiling 22 and floor 32, forming the smaller U of FIG. 2, are seen as part of the aquarium section of this invention. Ceiling 22 is seen to have opening 23 to provide access to aquarium compartment 12. It can be seen in FIG. 3 that sectional aquarium 10 has several integrated sections—filtering chamber 42, aquarium compartment 12, bottom filter 26 as well as the unseen pump containing section and support section (shown in FIG. 1).

Aquarium compartment 12 includes bottom filter 26. Bottom filter 26 preferably comprises grid 30, bonded foraminous screen 33 and gravel layer 34. Grid 30 rests on pipes 28 (shown in cutaway) which, in turn, rest on aquarium compartment floor 32. The water flow through bottom filter 26, indicated by arrows 35, is explained more fully with reference to FIG. 4.

Mechanical filter chamber 42 preferably contains a multistage filter 48 and reservoir 44. Filter 48 has the following layers: grid 50, laminated screening 51, charcoal 56, foraminous screening 52 and ceramic rings 54. Charcoal 56 may be eliminated completely or some other chemical filtrant may be substituted for it.

Also seen in FIG. 3 is tubing 58 and 60 which lead, respectively, to and from a pump 96. Pump 96 is placed inside housing 11 (seen in FIG. 1).

Also seen in FIG. 3 is reservoir 44, divided by shelf 76 into reservoir top half 45 and reservoir bottom half 43. The ceiling of reservoir 44 is formed by grid 50 of mechanical filtering chamber 42. The floor of reservoir 44 is a continuation of floor 32 of aquarium compartment 12. Thus, the U-shaped construction of aquarium 10 is again seen with floor 32, wall 20 and ceiling 22.

The arrows in FIG. 3 indicate the flow of water. The flow pattern of sectional aquarium 10 is essential to its creation of a healthy environment for fish, as well as providing an attractive aquarium. Water is pumped from standard pump 96, through tubing 60, in direction of arrow 62. Water enters reservoir bottom half 43 from tubing 60. From reservoir bottom half 43, a portion of water flows into pipes 28, through panel 24, as shown by arrows 64. Only one pipe 28 is shown in this Figure, the other having been omitted for clarity. Water escapes pipe 28 through perforations near its underside.

Pipes 28 also enter into vertical panel 24 and open into its channel 78 as will be explained in connection with FIGS. 4, 5 and 6. The pattern of water flow from pipes 28 through filter 26 is more clearly explained in reference to FIGS. 4, 5 and 6. Water entering aquarium 12 through panel 24 causes formation of water currents as indicated by arrows 69.

When the water level is high enough in aquarium compartment 12, water flows through L-shaped screen 46 (shown exploded) in the direction of arrows 70, into mechanical filtering chamber 42. Screen 46 is L-shaped, but one leg of screen 46 is shown in phantom to expose slots 68. Bottom edge 47 of screen 46 is inserted into recessed top 66 of panel 24. Screen 46 has narrow slots 68 to allow passage of water while preventing the escape of fish into mechanical filter chamber 42. Screen 46 also creates turbulence, adding oxygen to the aquarium water and driving off carbon dioxide. Screen 46 controls the waterfall by creating a difference in water levels in sections 12 and 42. When screen 46 is removed, the waterfall ceases and water levels become equalized. Because screen 46 also filters surface dirt from water in aquarium compartment 12, it is conveniently removable for cleaning purposes. Removal of screen 46 also allows access to compartment 42 for servicing.

Water, after flowing through screen 68 by gravity, flows through the layers of mechanical filter 48 (in the direction of arrows 72) into reservoir upper half 45. Water from reservoir upper half 45 is drawn into tubing 58 in the direction of arrows 59 and flows through tubing 58 in the direction of arrow 74. Shelf 76 separates and allows filtered water from filter 48 to be removed to pump 96. From pump 96, the pattern of water circulation is repeated.

Thus, it is seen that water is in constant circulation in a continuous process of filtration and aeration. Water is biologically filtered in bottom filter 26 and mechanically filtered in filter 48. It is aerated by the production of currents as water escapes vertical panel 24 and pipes 28, and as it overflows aquarium compartment 12 through screen 46 in a "waterfall" to mechanical filter 48.

Very complete filtering and oxygenating processes are carried out, all invisible to the person viewing aquarium 10. No air bubbles are created, eliminating spray and salt deposits. No unsightly tubes or containers are presented to the viewer and the fish themselves have a roomy, unimpeded environment.

An optional standard aquarium heater may be placed on shelf 76. A heater in this position would heat the water in reservoir upper half 45 of from which aquarium water is circulated. Again, the heater would be invisible to the viewer, but would still efficiently heat the aquarium water.

Figure 4:
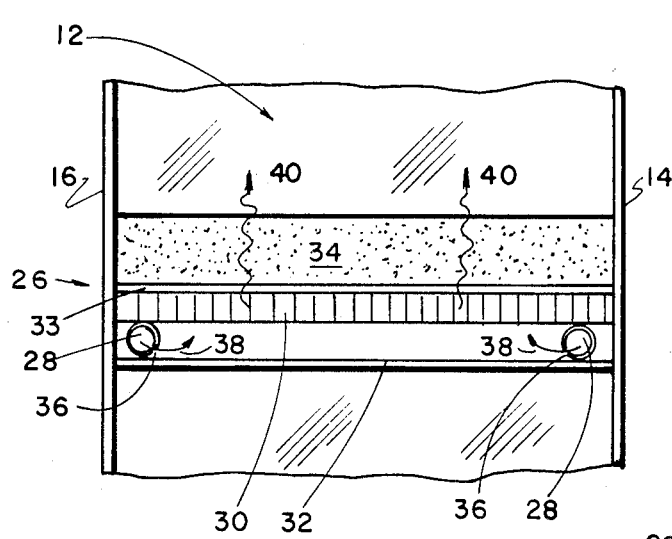
FIG. 4 is a cross section of the bottom filter of the aquarium compartment taken along lines 4—4 of FIG. 3.

Now referring to FIG. 4, a cross section of bottom filter 26 is shown. Bottom filter 26 rests on horizontal pipes 28 which rest on floor 32 of aquarium compartment 12. Bottom filter 26 has three layers: grid 30, laminated screen 33 and gravel 34. Grid 30, preferably plastic, rests on horizontal pipes 28. Grid 30 is of a size to extend to, and touch, longitudinal walls 14 and 16, end wall 18 (seen in FIG. 1) and vertical panel 24 (seen in FIG. 3).

Screen 33 is preferably a very thin layer of fiberglass screening or any foraminous material which will allow passage of water from floor 32 to gravel 34 while preventing gravel 34 from falling through screen 33 to grid 30. Gravel 34, preferably, should form a layer about three inches in depth. Gravel 34 may be dolomite in a salt water aquarium, or any suitable conventional aquarium gravel in a fresh water aquarium.

Water flowing through pipes 28 escapes through perforations 36 to enter aquarium compartment 12. Since perforations 36 are preferably open at approximately a 30 degree angle to floor 32, water deflects off floor 32 and into grid 30 in direction of arrows 38. Water then flows upward, through bottom filter 26, in the direction of arrows 40. As water passes through gravel 34, it is biologically filtered by denitrification by bacteria attached to the gravel surfaces, as is known in the art. Water has been prefiltered of larger particles by mechanical filter 48 (seen in FIG. 2), thus the gravel bed will not clog up. This necessary biological filtration takes place continuously as water flows into aquarium compartment 12 through pipes 28. Screen 33 and grid 30 of bottom filter 26 are hidden from view (see FIG. 1) so that, although bottom filter 26 is an integral part of sectional aquarium 10, its workings are not visible to the viewer. This sequence of mechanical filtering, biological filtering and aeration is important to the efficiency of aquarium 10.

Figure 5:
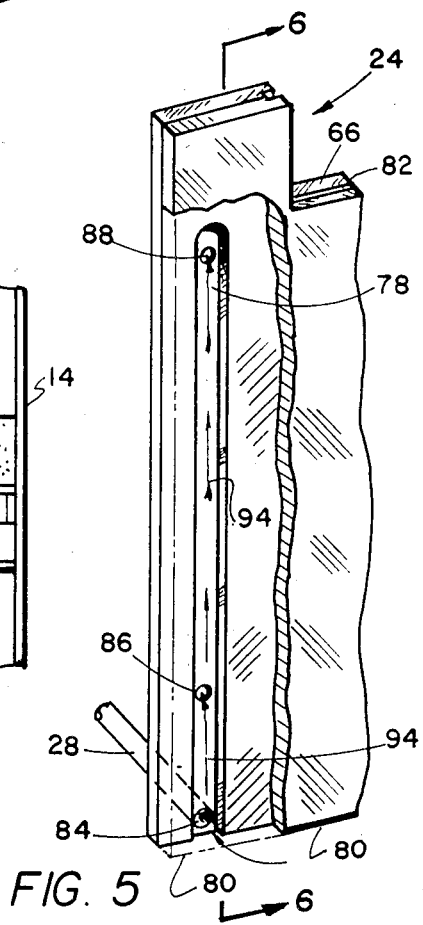
FIG. 5 is a partial section in cutaway taken along lines 5—5 of FIG. 3.

Now referring to FIG. 5, a partial section of vertical panel 24 in cutaway is shown. Panel 24 contains at least one vertical channel 78. Proximate bottom edge 80 of vertical panel 24 is aperture 84. Pipe 28 is inserted into aperture 84 and opens into channel 78. Water from reservoir bottom half 43 (seen in FIG. 3) enters channel 78 and flows into pipe 28 through aperture 84. Water entering channel 78 also flows upward in direction of arrows 94 to be released through apertures 86 and 88 directly into aquarium compartment 12.

Water leaving aperture 86, located proximate top surface of gravel 34, creates a current across gravel 34 (seen in FIG. 3). This current inhibits the accumulation of debris. Water released from aperture 88 creates a current just below the upper water surface. This current (seen in FIG. 3), at arrow 65, helps agitate the water and oxygenates it.

Also seen in FIG. 5 is recessed top wall 66 of panel 24. Into this recessed section 66 is placed screen 46 (seen in FIG. 3). Bottom edge 47 and side edge 49 of screen 46 (seen in FIG. 3) fit into slot 82. Thus, screen 46 is firmly held in place, but is easily removed for cleaning. When screen 46 is removed, as in FIG. 5, a person can reach into mechanical filter chamber 42 from aquarium compartment 12 to service filtering components.

Now referring to FIG. 6, a cross section of channel 78 is shown. Water leaving reservoir 43 in the direction of arrow 106 simultaneously enters channel 78 and pipe 28 through aperture 84. Water entering pipe 28 moves in the direction of arrow 100 where it enters aquarium compartment 12 as described in FIGS. 3 and 4. Water simultaneously enters channel 78 and moves in the direction of arrows 98; a portion of water then exits channel 78 through aperture 86 in the direction of arrow 104. Another portion of water continues up channel 78 in the direction of arrow 98 to exit from aperture 88 in the direction of arrow 102.

In the preferred embodiment, there are two or more channels 78. The second channel 78 would omit aperture 88. By including only one aperture 88, an active circular current is created across the top of aquarium compartment 12, prevent accumulation of surface film. Also, the greater the agitation, the more effective the aeration of water—another reason for elimination of one apertures 88.

There are many variations which may be practiced within the scope of this invention. First, although two pipes 28 have been described, any number of pipes 28 which will allow the proper flow of water may be used.

Secondly, it is preferable to have two channels 78—one in each end of vertical panel 24, at least one with two apertures. However, it would be within the scope of this invention to have another channel or more apertures in the channels.

A ratio of 11:1 is preferred for the size of aquarium compartment 12 as compared to reservoir 44. A ratio of 11:1 creates an active waterfall over panel 24. Another ratio which still creates a turbulence would be acceptable.

A heater is optional but within the scope of this invention.

The material elements of multistage mechanical filter 48 may be as described, or substitutions of other material are permissible. Ceramic rings 54 could be plastic or some other material. Foraminous screen is preferred to be polyfoam, but any nontoxic foraminous material may be used.

Charcoal 56 is shown on grid 50, but charcoal 56 may be eliminated.

There are many advantages to this invention. First is that complete filtration and aeration of the aquarium are carried out in sequence for greater efficiency and without the necessity of any extraneous equipment.

Second, the aquarium of this invention provides a free standing, self contained, simple to assemble unit which allows the viewer an unimpeded and attractive view of the fish on display.

Thirdly, this complete aquarium is suitable for home or business display of either fresh or salt water fish. It is also useful for commercial or laboratory use, especially when more than one of these aquaria are used in a multiple system.

Having now described and illustrated my invention, it is not intended that such description limit this invention, but rather that this invention be limited only by a reasonable interpretation of the appended claims.

What is claimed is:

1. A sectionalized integrated filtering aquarium comprising:
   (a) a generally parallelpipedal, combined aquarium and housing, said combined aquarium and housing formed of two interlocking, bondable, U-shaped sections, said first U-shaped section forming two longitudinal walls and one end wall of said housing, said second U-shaped section forming a ceiling, an end wall, and an aquarium floor:
   (b) a vertical panel bonded to said aquarium's ceiling and aquarium floor, said panel separating said aquarium into two compartments, said first a large aquarium compartment and a second smaller mechanical filtering chamber, said panel including internal plumbing members to release water to said aquarium compartment, and a slotted removable section proximate top of said panel, said slotted section creating a waterfall from said aquarium compartment into said mechanical filtering chamber;
   (c) a bottom filter;
   (d) a filtering assembly located in said mechanical filtering chamber;
   (e) a segmented reservoir located in the lower area of said mechanical filtering chamber;
   (f) at least two horizontal pipes extending from said reservoir through said aquarium compartment, said pipes disposed along said aquarium compartment floor; and,
   (g) external pumping means connected to said sectional aquarium by tubing,
   whereby, when water is pumped from said reservoir into said aquarium compartment through said panel and piping, a continuous process of filtering and aeration occurs in said aquarium and said mechanical filtering chamber.

2. The sectionalized integrated filtering aquarium according to claim 1 wherein said aquarium compartment is approximately eleven times greater in size than said reservoir.

3. The sectionalized integrated filtering aquarium according to claim 1 wherein said bottom filter includes a grid covered by foraminous screening, said screening covered by gravel and preventing said gravel from falling through said grid, said grid resting on said piping, said piping being horizontal and leading from said reservoir into said aquarium compartment through said vertical panels, said horizontal piping proximate said floor and parallel to said longitudinal walls, said piping perforated so that water in said piping is forced downward onto said floor, said water then biologically filtered as it rises through said bottom filter.

4. The sectionalized integrated filtering aquarium according to claim 1 wherein said filtering assembly in said mechanical filtering chamber includes, in serial order, a coarse mechanical screen of ceramic stoneware rings, a foraminous foam screen, said screen suspended on a grid so that water entering said mechanical filtering chamber through said slotted section in said vertical panel flows by gravity through said screens and grid into said reservoir from where said water is returned to circulation by said pump.

5. The sectionalized integrated filtering aquarium according to claim 4 including, additionally, a chemical filterant between said grid and said screen of said mechanical filtering chamber.

6. The sectionalized integrated filtering aquarium according to claim 1 including, additionally, a heating element located in said reservoir.

7. The sectionalized integrated filtering aquarium according to claim 1 wherein said vertical panel's plumbing members include means defining at least one aperture in said panel's bottom ends, said aperture(s) opening into said horizontal pipes, at least one vertical water-passing channel between said panel's vertical walls, said channel(s) including means defining at least one aperture, to permit passage of water to said aquarium compartment.

8. The sectionalized integrated aquarium according to claim 7 wherein there are two vertical channels in said panel, one at each of said panel's sides.

9. The sectionalized integrated filtering aquarium according to claim 1 wherein said ceiling includes means defining at least one opening to permit entrance into said aquarium compartment.

10. The sectionalized integrated filtering aquarium according to claim 1 whereby said housing is acrylic.

11. The sectionalized integrated filtering aquarium according to claim 1 wherein said housing's exterior surfaces are painted so to allow only said aquarium compartment to be visible.

12. The sectionalized integrated aquarium according to claim 1 including, additionally, a removable lid to rest on top edge of said housing's longitudinal and end walls.

13. The sectionalized integrated aquarium according to claim 1 including, additionally, a second end wall for said housing.

14. The sectionalized integrated aquarium according to claim 13 including, additionally, means defining vents in said second end wall to provide ventilation.

15. The sectionalized integrated aquarium according to claim 1 including, additionally, means defining vents in said ceiling to provide ventilation to said aquarium compartment.

* * * * *